H. C. KESTEL.
GREASE CUP.
APPLICATION FILED SEPT. 11, 1915.

1,191,189.  Patented July 18, 1916.

INVENTOR
Henry C. Kestel.
by
Owen Owen Crampton

UNITED STATES PATENT OFFICE.

HENRY C. KESTEL, OF TOLEDO, OHIO, ASSIGNOR OF ONE-HALF TO WILLIAM H. MINIER, OF TOLEDO, OHIO.

GREASE-CUP.

1,191,189.

Specification of Letters Patent.

Patented July 18, 1916.

Application filed September 11, 1915. Serial No. 50,136.

*To all whom it may concern:*

Be it known that I, HENRY C. KESTEL, a citizen of the United States, and a resident of Toledo, in the county of Lucas and State of Ohio, have invented a certain new and useful Grease-Cup; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to grease cups.

It has for its object to provide a grease cup wherein the inconvenience of starting the cup on the thread upon returning it into position after the removal thereof to fill with grease, is entirely done away with. In the cups commonly used in the art, replacement of the cups is attended with considerable difficulty in finding the starting thread. This, in the use of the grease cup, is broken, bent, or the threads become "crossed," whereupon the cup becomes useless. By my invention I have provided a cup which, while it is provided with threaded means for forcing the grease into the parts that are to be greased, it is also so constructed that the cup may be filled and closed without the necessity of finding starting threaded parts.

The invention may be contained in a great variety of devices. I have selected a device as an example of structures containing my invention and will describe its construction and mode of operation hereinafter.

The device selected is illustrated in the accompanying drawings wherein,—

Figure 1:
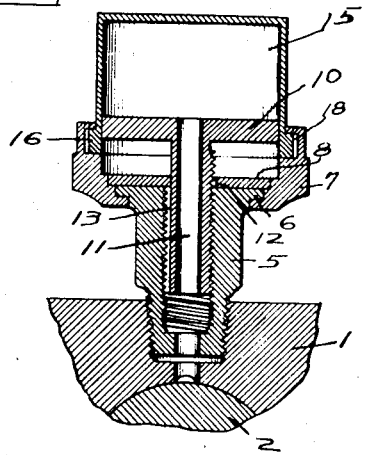
Figure 2:
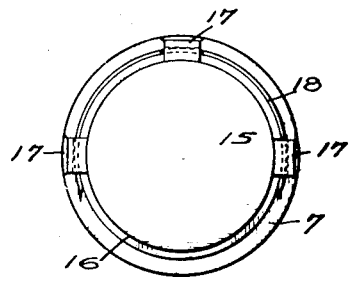
Figure 4:
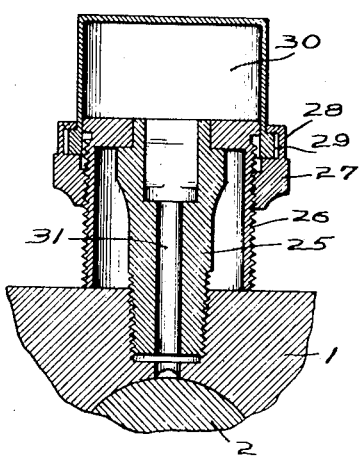
Figure 3:
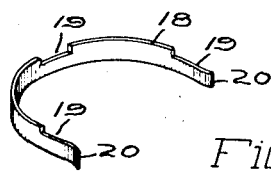
Figure 7:
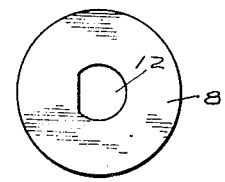
Figure 5:
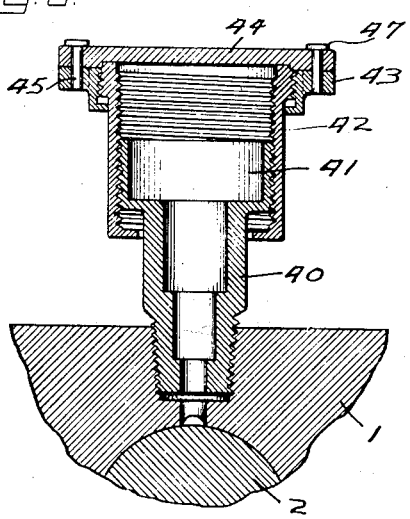
Figure 6:
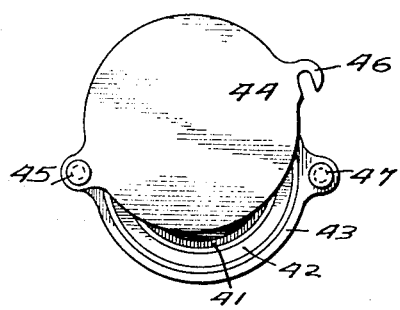

Figure 1 illustrates a section through the grease cup. Fig. 2 is a top view of the grease cup. Fig. 3 illustrates a spring for holding the grease cup. Fig. 4 is another device containing the invention. It is a modification of the construction shown in Fig. 1. Fig. 5 illustrates a third construction containing the invention, showing a grease cup which is filled without removal of the cup from the machine or parts to be lubricated. Fig. 6 is a top view of the device illustrated in Fig. 5. Fig. 7 illustrates a washer shown in section in Fig. 1.

1 and 2 are parts which are greased which are here shown merely diagrammatically for the purpose of indicating any two relatively movable parts which it is desired to lubricate.

A plug 5 is inserted into a threaded opening in the part 1. The upper end of the plug 5 is provided with a flange 6. A ring 7 sets over the flange 6, while a washer 8 is placed over the upper end of the plug 5. The washer 8 is forced in a stepped portion of the ring 7 or is burred so as to secure the washer 8 in its position in the ring 7, to hold the ring 7 against the flange 6, and thereby hold the ring 7 in its position on the upper end of the plug 5, and yet permit rotation of the ring relative to the plug. The plug is tapped and a plunger or piston 10, having a threaded hollow stem 11, may be threaded into the plug 5. The washer 8 has a D-opening 12, while the plug 11 has its thread removed from one side 13. The stem is movable through the D-opening 12. Rotation of the ring 7 and the washer 8 causes rotation of the plunger 10, and consequently causes the stem 11 to move rotatively and axially in the plug 5. The head of the plunger 10, when in its lowermost position, fits into the ring 7.

On top of the ring 7 and above the recess for the top or head of the plunger 10 is located a cup 15. The cup 15 is provided with a rim or flange 16 while the ring 7 is provided with three inwardly extending fingers 17 which extend over the rim 16 of the cup and so as to hold the cup 15 from axial displacement. Two of the fingers 17 are located diametrically opposite, while the third finger is located at the quadrant of the rim. A spring 18 has notches 19 cut in such a way as to fit under the inwardly extending portions of the fingers 17. The spring 18 is placed within the fingers 17 and will, by reason of its elasticity, and by reason of the notches 19, which fit under the fingers 17, be held in position on the top of the ring 7.

The ends 20 of the spring are flared outward and are located more than 180 degrees around the ring so that while the cup may be moved laterally, and in a direction opposite to the position of the middle finger 17, yet it will be yieldingly restrained in such movement. The cup 15 may thus be snapped off or back into position and will be yieldingly held in its position on the ring when the head of the piston 10 is in its lowermost position. If, however, the ring 7 is given a short turn, the top of the head of the plunger 10 will pass the lower edge of the inverted cup 15 and will prevent the removal of the cup 15 until the ring has been turned so as to again bring the head of the plunger 10 within the ring 7.

In the operation of the device the cup 15 may be removed by merely drawing it laterally when the plunger head is at its lowermost point. The cup may then be filled with grease and snapped into position within the spring and between the fingers 17, and the ring 7 may be turned so as to force the grease as may be desired through the hollow stem 11 into a suitable opening which leads to the point of contact between the parts to be lubricated.

In the form of construction shown in Fig. 4, the plug 25 is threaded into a tap opening in one of the parts. It is provided with a sleeve 26 which is secured to the upper end of the plug 25. A ring 27, having the fingers 28 and the spring 29, is threaded on the sleeve 26. The fingers 28 and the spring 29 are the same in construction as the spring and fingers of the construction shown in Fig. 1. The cup 30 is secured to the ring 27 in the same way that the cup is secured to the ring 7 in the form of the invention shown in Fig. 1.

In the operation of the device, the cup 30 is moved by lateral displacement thereof when the ring 27 is in its uppermost position so as to permit the cup 30 to pass over the top of the sleeve 26. The cup 30 is filled with grease and is again snapped into position on the ring 27. The ring 27 is then turned to force the grease contained in the cup through the opening 31 in the plug 25 and to the bearing surfaces of the parts to be lubricated.

In the form of invention illustrated in Fig. 5, the plug 40 is also threaded into a tapped opening leading to the bearing surfaces between the parts 1 and 2. The plug 40 is provided with a head 41 which is threaded. The threaded cup 42 is provided with a threaded ring 43 which may be threaded upon the exterior of the cup 42. The ring 43 is provided with a cover 44 which is pivoted by the pivot pin 45 to the ring 43. The cover 44 is provided with a hook or a slotted ear 46 which engages the pin 47 when the cover is closed. The inside of the cover 44 is slightly recessed to receive the upper end of the cup 42. When the ring 43 is turned to turn the grease cup to force the grease through the plug 40, the ring will turn upon the external thread to cause the ring 43 to move axially until the cup 42 enters the recessed portion of the cover 44. When the upper end of the cup 42 enters the recessed part of the cover 44, the cover 44 cannot be opened.

In the operation of the device, the rim 43 is unscrewed, whereupon the cover 44 may be opened and the cup 42 may be filled with grease. The cover 44 may then be closed, and the ring 43 may be rotated. It will move a short distance axially on the cup 42, whereupon the cup 42 will begin to rotate about the head 41 and the grease will be forced to the surfaces to be lubricated.

Having thus described my invention, what I claim as new, and desire to secure by Letters Patent, is, as follows:

1. In a grease cup, the combination of a cup member, a plug, the grease cup swiveled on the plug and means for forcing the grease from the cup.

2. In a grease cup, the combination of a cup member, a plug, a ring connected to the plug and having inwardly extending fingers adapted to engage the rim of the cup, a spring located intermediate the fingers for yieldingly holding the cup on the ring.

3. In a grease cup, the combination of a cup member, a plug, a ring connected to the plug and having inwardly extending fingers adapted to engage the rim of the cup, a spring located intermediate the fingers for yieldingly holding the cup on the ring, a plunger threaded in the plug and means connecting the plunger with the ring for rotating the plunger.

4. In a grease cup, the combination of a plug, a member permanently connected to the outer end of the plug, a cup releasably connected to the member and means for forcing the grease from the cup.

5. In a grease cup, the combination of a plug having internal threads, a cup swiveled on the plug, means operated by the internal threads of the plug for forcing the grease from the cup.

6. In a grease cup, the combination of a cup member, a plug, a rotatable member swiveled on the plug, the cup member releasably connected with the rotatable member and means operated by the rotatable member for forcing the grease from the cup.

7. In a grease cup, the combination of a cup member, a plug, a rotatable member swiveled on the plug, the cup member releasably connected with the rotatable member for forcing the grease from the cup and locking the cup to the rotatable member.

8. In a grease cup, the combination of a cup member, a plug, a ring connected to the plug and removably connected to the cup member, a plunger threaded in the plug and means connecting the plunger with the ring for rotating the plunger.

In testimony whereof, I have hereunto signed my name to this application.

HENRY C. KESTEL.